United States Patent
Meredith, II et al.

(10) Patent No.: US 11,403,629 B2
(45) Date of Patent: Aug. 2, 2022

(54) SYSTEMS AND METHODS THEREOF FOR EXCHANGING DIFFERENT DIGITAL CURRENCIES ON DIFFERENT BLOCKCHAINS

(71) Applicants: Thomas T. Meredith, II, Roswell, GA (US); Morris Mwanga, Atlanta, GA (US)

(72) Inventors: Thomas T. Meredith, II, Roswell, GA (US); Morris Mwanga, Atlanta, GA (US)

( * ) Notice: Subject to any disclaimer, the term of this patent is extended or adjusted under 35 U.S.C. 154(b) by 0 days.

(21) Appl. No.: 17/544,405

(22) Filed: Dec. 7, 2021

(65) Prior Publication Data

US 2022/0180355 A1    Jun. 9, 2022

Related U.S. Application Data

(60) Provisional application No. 63/122,215, filed on Dec. 7, 2020.

(51) Int. Cl.
    *G06Q 20/38*      (2012.01)
    *G06Q 20/06*      (2012.01)

(52) U.S. Cl.
     CPC ......... *G06Q 20/381* (2013.01); *G06Q 20/065* (2013.01); *G06Q 20/389* (2013.01); *G06Q 20/3823* (2013.01); *G06Q 20/3825* (2013.01); *G06Q 20/3827* (2013.01)

(58) Field of Classification Search
     CPC ............... G06Q 20/381; G06Q 20/065; G06Q 20/3823; G06Q 20/3825; G06Q 20/3827; G06Q 20/389

USPC .......................................................... 705/39
See application file for complete search history.

(56) References Cited

U.S. PATENT DOCUMENTS

| | | | |
|---|---|---|---|
| 2006/0036548 A1 | 2/2006 | Roever et al. | |
| 2016/0092988 A1* | 3/2016 | Letourneau | G06Q 20/3829 705/66 |
| 2017/0005804 A1 | 1/2017 | Zinder | |
| 2017/0232300 A1 | 8/2017 | Tran et al. | |
| 2019/0057362 A1 | 2/2019 | Wright et al. | |

(Continued)

FOREIGN PATENT DOCUMENTS

| | | | | |
|---|---|---|---|---|
| CN | 112513907 A | * | 3/2021 | ............. G06F 17/11 |
| GB | 2576081 A | * | 2/2020 | ........... G06Q 20/108 |

(Continued)

OTHER PUBLICATIONS

"Atomex Announces the Launch of Atomic Swap Cross-chain Hybrid DEX for Windows, Linux and Web Platforms." PR Newswire Europe Including UK Disclose. New York. Jun. 4, 2020. (Year: 2020).*

(Continued)

*Primary Examiner* — Sara C Hamilton
(74) *Attorney, Agent, or Firm* — Carter, DeLuca & Farrell LLP; George Likourezos

(57) ABSTRACT

A contract manager system is a system that allows at least two entities to exchange digital currencies of a different type or on different blockchains (e.g., exchanging XLM digital currency for Stellar Ledger digital currency). The system includes a graphical user interface (GUI) including a display, a processor, and memory. The memory includes instructions stored thereon, which, when executed by the processor, cause the system to execute an atomic swap.

22 Claims, 14 Drawing Sheets

(56) References Cited

U.S. PATENT DOCUMENTS

| | | | | |
|---|---|---|---|---|
| 2019/0156301 A1* | 5/2019 | Bentov | ............... | G06Q 20/405 |
| 2019/0173854 A1* | 6/2019 | Beck | ............... | H04L 9/3247 |
| 2019/0180371 A1* | 6/2019 | Benkert | ............... | G06Q 40/04 |
| 2019/0251080 A1* | 8/2019 | Lu | ............... | G06F 21/64 |
| 2019/0259025 A1* | 8/2019 | Hilton | ............... | G06Q 20/0658 |
| 2019/0303927 A1* | 10/2019 | Shao | ............... | G06Q 20/108 |
| 2019/0311337 A1* | 10/2019 | Madisetti | ............... | G06Q 20/0658 |
| 2019/0311357 A1* | 10/2019 | Madisetti | ............... | H04L 9/3236 |
| 2019/0370792 A1* | 12/2019 | Lam | ............... | G06Q 40/04 |
| 2019/0385156 A1* | 12/2019 | Liu | ............... | G06Q 20/3672 |
| 2019/0392489 A1* | 12/2019 | Tietzen | ............... | G06Q 20/308 |
| 2020/0042988 A1* | 2/2020 | Snow | ............... | G06Q 30/0208 |
| 2020/0042995 A1* | 2/2020 | Snow | ............... | G06Q 40/04 |
| 2020/0082360 A1* | 3/2020 | Regev | ............... | G06Q 20/3678 |
| 2020/0175506 A1* | 6/2020 | Snow | ............... | H04L 9/3239 |
| 2021/0019737 A1* | 1/2021 | Vladi | ............... | G06Q 20/0658 |
| 2021/0090166 A1* | 3/2021 | Bayne | ............... | G06Q 20/3674 |
| 2021/0217084 A1* | 7/2021 | Diamond | ............... | G06F 21/64 |
| 2021/0218552 A1* | 7/2021 | Wright | ............... | H04L 9/3213 |
| 2021/0319510 A1* | 10/2021 | Lee | ............... | G06Q 40/04 |
| 2021/0344500 A1* | 11/2021 | Vaughan | ............... | H04L 9/3239 |
| 2021/0398112 A1* | 12/2021 | Ward | ............... | G06Q 20/401 |
| 2021/0398211 A1* | 12/2021 | Maathur | ............... | G06Q 20/381 |
| 2021/0407001 A1* | 12/2021 | Yang | ............... | G06Q 20/0652 |

FOREIGN PATENT DOCUMENTS

| | | | | |
|---|---|---|---|---|
| WO | WO-2019123001 A1 * | 6/2019 | ............ | G06Q 40/04 |
| WO | WO-2019220270 A1 * | 11/2019 | ............ | H04L 9/0819 |
| WO | WO-2021142338 A1 * | 7/2021 | ............ | G06F 21/64 |
| WO | WO-2021155915 A1 * | 8/2021 | | |
| WO | WO-2021194114 A1 * | 9/2021 | ............ | G06Q 20/065 |
| WO | WO-2021246632 A1 * | 12/2021 | | |

OTHER PUBLICATIONS

"Cross-Chain Trading Network Using Smart Contract," by Huy Quang Tran. University of Houston. Proquest Dissertations Publishing. 2020. (Year: 2020).*

"Antier Solutions Introduces Cryptocurrency Exchange Development Services." ICT Monitor Worldwide. Amman. Jul. 5, 2018. (Year: 2018).*

"Cross-Chain Trading Looks to Make Crypto More Attractive to Wall Street Here's Who's Leading The Charge," by Luis Aureliano. Benzinga Newswires. Southfield. Feb. 22, 2018. (Year: 2018).*

"Multi-Chain Architecture for Blockchain Networks," by Kristian Kostal. Information Sciences and Technologies. 12.2:8-14. Slovak Technical University Press. Dec. 2020. (Year: 2020).*

"Multilateral Transparency for Securities Markets Through DLT," by David C. Donald and Mahdi H. Miraz. Fordham Journal of Corporate & Financial Law 25.1: 97-153. Fordham Journal of Corporate & Financial Law. 2020. (Year: 2020).*

"An Analysis of Atomic Swaps on and between Ethereum Blockchains Using Smart Contracts," by Peter Bennink and Lennart van Gijtenbeek. Supervisors: Oskar van Deventer and Maarten Everts. Research Project I Security & Network Engineering. Feb. 11, 2018. (Year: 2018).*

"Distributed Atomic Swap on Cryptocurrencies," by Huseyin Ergun; Mesut Razbonyali; Erdal Guvenoglu; and Can Razbonyali. Computer Engineering and Intelligent Systems. Vol. 11, No. 4. 2020. (Year: 2020).*

"Extending Atomic Cross-chain Swaps," by Jean-Yves Zie; Jean-Christophe Deneuville; Jeremy Briffaut; and Benjamin Nguyen. 2019. (Year: 2019).*

"Towards Blockchain Interoperability," by Stefan Schulte; Marten Sigwart; Philipp Frauenthaler; and Michael Borkowski. 2019. (Year: 2019).*

International Search Report and Written Opinion issued in corresponding International Application No. PCT/US21/62179, dated Feb. 18, 2022, pp. 1-11.

* cited by examiner

SYSTEMS AND METHODS THEREOF FOR EXCHANGING DIFFERENT DIGITAL CURRENCIES ON DIFFERENT BLOCKCHAINS

TECHNICAL FIELD

This disclosure is generally related to digital currency and blockchain technologies, specifically, discloses a system enabling exchange of digital currencies on different blockchains.

BACKGROUND

Crypto tokens or cryptocurrencies have been introduced to the commence less than two decades ago. Nevertheless, the market for cryptocurrencies (e.g., Bitcoin, Etherium, Solana, etc.) has greatly increased in size and volume. Transactions of cryptocurrency are stored in a distributed ledger in a blockchain form. Since each cryptocurrency or blockchain has its own specific structure, which are not compatible with other cryptocurrencies or blockchains, transactions directly between two or more cryptocurrencies or blockchains are not feasible. Thus, there are rooms for improvement in smooth transactions therebetween.

SUMMARY

A contract manager system is a system that allows at least two entities to exchange digital currencies of a different type or on different blockchains (e.g., exchanging XLM digital currency for Stellar Ledger digital currency). The system includes a graphical user interface (GUI) including a display; a processor; and memory. The memory includes instructions stored thereon, which, when executed by the processor, cause the system to execute an atomic swap.

According to aspects of the present disclosure, a contract manager system is for exchanging a first digital currency on a first blockchain with a second digital currency on a second blockchain. The contact manager system includes a graphical user interface (GUI) including a display, a processor, and a memory, including instructions stored thereon. The instructions, when executed by the processor, cause the system to display terms of an agreement between a first entity on the first blockchain and a second entity on the second blockchain via the GUI; enable the first entity to send to a first smart contract a first transaction payload that includes the terms of the agreement, in escrow; generate a first hash of the first transaction payload; send the terms of the agreement from the first smart contract to a first outgoing oracle; extract and validate the terms of the agreement from the first smart contract based on the first transaction payload by the first outgoing oracle; send the validated terms of the agreement from the first outgoing oracle to a contract manager, via a first incoming oracle; send, by the contract manager, the terms of the agreement to a second smart contract; enable the second entity to send to the second smart contract a second transaction payload and the first hash in escrow; validate the second transaction payload, which is sent to the second smart contract by a second outgoing oracle; send the first transaction payload to the second smart contract and the second transaction payload to the first smart contract, transfer the second transaction payload from the first smart contract to the first entity; transfer the first transaction payload from the second smart contract to the second entity; display to the first entity via the GUI receipt of the transfer of the second transaction payload; and display to the second entity via the GUI receipt of the transfer of the first transaction payload.

In various aspects, the terms of the agreement include an exchange rate between the first digital currency and the second digital currency, a lifetime of the terms of the agreement, a public blockchain key of the second blockchain of the first entity (PBK2A), and a public blockchain key of the first blockchain of the second entity (PBK1B). The first transaction payload further includes the lifetime of the terms of the agreement, a first amount of the first digital currency, an expected amount of the second digital currency, the public blockchain key of the second blockchain of the first entity (PBK2A), and a public blockchain key of the second blockchain of the second entity (PBK2B). The second transaction payload includes a second amount of the second digital currency approximately equal to the expected amount of the first digital currency, the first hash; and the public blockchain key of the first blockchain of the second entity (PBK1B).

In various aspects, the first hash of the first transaction payload is generated when the terms of the agreement from the first outgoing oracle to the contract manager are sent. The instructions, when executed by the processor, further cause the system to send the first hash to the first outgoing oracle with the terms of the agreement, send the first hash from the first outgoing oracle to the contract manager with the validated terms of the agreement, send the first hash from the contract manager to the second smart contract via the first incoming oracle, and send and display via the GUI receipt of the first hash to the second entity.

In further various aspects, the instructions, when executed by the processor, further cause the system to set a status of the first smart contract to incomplete after the first smart contract receives the first transaction payload from the first entity, set the status of the second smart contract to incomplete after the second contract receives the second transaction payload to the second entity, set the status of the first smart contract and the second smart contract to in progress if the system validates the second transaction payload, which was sent to the second smart contract, and set the status of the first smart contract and the second smart contract to complete after the transfer of the second transaction payload from the first smart contract to the first entity and the transfer of the first transaction payload from the second smart contract to the second entity. The system returns the first transaction payload to the first entity, the second transaction payload to the second entity, or both, if, after expiration of a lifetime of the first smart contract or the second smart contract, the status of the first smart contract or the second smart contract remains as incomplete.

In still further aspects, the first smart contract holds the first amount of the first digital currency in escrow and the second smart contract holds the second amount of the second digital currency in escrow.

In yet still further aspects, the instructions, when executed by the processor, after validating the terms of the agreement based on the second transaction payload, further cause the system to send the first transaction payload and the second transaction payload to the first outgoing oracle and the second outgoing oracle, respectively, send the first transaction payload and the second transaction payload from the first outgoing oracle and the second outgoing oracle, respectively, to the contract manager, send the first transaction payload from the contract manager to the second smart contract via the first incoming oracle, and send the second transaction payload from the contract manager to the first smart contract via a second incoming oracle.

According to aspects of the present disclosure, a computer-implemented method is for exchanging a first digital currency on a first blockchain with a second digital currency on a second blockchain. The method includes displaying terms of an agreement between a first entity on the first blockchain and a second entity on the second blockchain via a graphical user interface (GUI); enabling the first entity to send to a first smart contract a first transaction payload according to the terms of the agreement, in escrow; generating a first hash of the first transaction payload; sending the terms of the agreement from the first smart contract to a first outgoing oracle, extracting and validating the terms of the agreement from the first smart contract using the first outgoing oracle; sending the validated terms of the agreement from the first outgoing oracle to a contract manager; via a first incoming oracle, sending, by the contract manager, the terms of the agreement to a second smart contract; enabling the second entity to send to the second smart contract a second transaction payload and the first hash in escrow; validating the second transaction payload, which is sent to the second smart contract by a second outgoing oracle; sending the first transaction payload to the second smart contract and the second transaction payload to the first smart contract; transferring the second transaction payload from the first smart contract to the first entity; transferring the first transaction payload from the second smart contract to the second entity; displaying to the first entity via the GUI receipt of the transfer of the second transaction payload; and displaying to the second entity via the GUI receipt of the transfer of the first transaction payload.

In various aspects, the terms of the agreement include an exchange rate between the first digital currency and the second digital currency, a lifetime of the terms of the agreement, a public blockchain key of the second blockchain of the first entity (PBK2A), and a public blockchain key of the first blockchain of the second entity (PBK1B). The first transaction payload further includes the lifetime of the terms of the agreement, a first amount of the first digital currency, an expected amount of the second digital currency, the public blockchain key of the second blockchain of the first entity (PBK2A), and a public blockchain key of the second blockchain of the second entity (PBK2B). The second transaction payload includes a second amount of the second digital currency approximately equal to the expected amount of the second digital currency, the first hash, and the public blockchain key of the first blockchain of the second entity (PBK1B).

In further various aspects, the first hash of the first transaction payload is generated when the terms of the agreement from the first outgoing oracle to the contract manager are sent. The method further includes sending the first hash to the first outgoing oracle with the terms of the agreement, sending the first hash from the first outgoing oracle to the contract manager with the validated terms of the agreement, sending the first hash from the contract manager to the second smart contract via the first incoming oracle, sending the first hash to the second entity; and displaying via the GUI receipt of the first hash.

In still further various aspects, the method further includes setting a status of the first smart contract to incomplete after the first smart contract receives the first transaction payload from the first entity, setting the status of the second smart contract to incomplete after the second contract receives the second transaction payload to the second entity, setting the status of the first smart contract and the second smart contract to in progress if the second transaction payload, which was sent to the second smart contract, is validated, and setting the status of the first smart contract and the second smart contract to complete after the transfer of the second transaction payload from the first smart contract to the first entity and the transfer of the first transaction payload from the second smart contract to the second entity. The method further includes returning the first transaction payload to the first entity, the second transaction payload to the second entity, or both, if, after expiration of a lifetime of the first smart contract or the second smart contract, the status of the first smart contract or the second smart contract remains as incomplete.

In yet further various aspects, the first smart contract holds the first amount of the first digital currency in escrow and the second smart contract holds the second amount of the second digital currency in escrow. The method further includes, after validating the second transaction payload, which was sent to the second smart contract, sending the first transaction payload and the second transaction payload to the first outgoing oracle and the second outgoing oracle, respectively, sending the first transaction payload and the second transaction payload from the first outgoing oracle and the second outgoing oracle, respectively, to the contract manager, sending the first transaction payload from the contract manager to the second smart contract via the first incoming oracle, and sending the second transaction payload from the contract manager to the first smart contract via a second incoming oracle.

According to aspects of the present disclosure, a contract manager system is for exchanging a first digital currency on a first blockchain with a second digital currency on a second blockchain. The contract manager includes a graphical user interface (GUI) including a display, a processor, and a memory including instructions stored thereon. The instructions, when executed by the processor, cause the system to display terms of an agreement between a first entity in the first blockchain and a second entity in the second blockchain via the GUI; enable the first entity and second entity to send to a first smart contract and a second smart contract, respectively, a first transaction payload, which includes the terms of the agreement, and a second transaction payload, respectively in escrow; send the terms of agreement from the first smart contract to a contract manager and from the contract manager to the second smart contract; validate the second transaction payload, which is sent to the second smart contract; send the first transaction payload to the second smart contract and the second transaction payload to the first smart contract; transfer the second transaction payload from the first smart contract to the first entity and transfer the first transaction payload from the second smart contract to the second entity; and display to the first and second entities, via the GUI, receipt of the transfer of the second and first transaction payloads, respectively.

In various aspects, the instructions, when executed by the processor, further cause the system to generate a first hash of the first transaction payload, send the terms of the agreement from the first smart contract to a first outgoing oracle, validate, by the first outgoing oracle, the terms of the agreement from the first smart contract, send, by the first outgoing oracle, the validated terms of the agreement to a contract manager, via a first incoming oracle, send, by the contract manager, the terms of the agreement to the second smart contract, and enable, via the GUI, the second entity to send to the second smart contract the first hash in addition to the second transaction payload.

According to aspects of the present disclosure, a computer implemented method is for exchanging a first digital currency on a first blockchain with a second digital currency on a second blockchain. The method includes displaying terms of an agreement between a first entity on the first blockchain and a second entity on the second blockchain via a graphical user interface (GUI); enabling the first entity and the second entity to send to a first smart contract and a second smart contract, respectively, a first transaction payload, which includes the terms of the agreement, and a second transaction payload, respectively in escrow; sending the terms of agreement from the first smart contract to a contract manager and from the contract manager to the second smart contract; validating the second transaction payload, which is sent to the second smart contract; sending the first transaction payload to the second smart contract and the second transaction payload to the first smart contract; transferring the second transaction payload from the first smart contract to the first entity and transferring the first transaction payload from the second smart contract to the second entity; and displaying to the first and second entities, via the GUI, receipt of the transfer of the second and first transaction payloads, respectively.

In various aspects, the method further includes generating a first hash of the first transaction payload; sending the terms of the agreement from the first smart contract to a first outgoing oracle, validating, by the first outgoing oracle, the terms of the agreement from the first smart contract; sending, by the first outgoing oracle, the validated terms of the agreement to the contract manager; via a first incoming oracle, sending, by the contract manager, the terms of the agreement from to the second smart contract; and enabling, via the GUI, the second entity to send to the second smart contract the first hash in addition to the second transaction payload.

DETAILED DESCRIPTION

Figure 11:
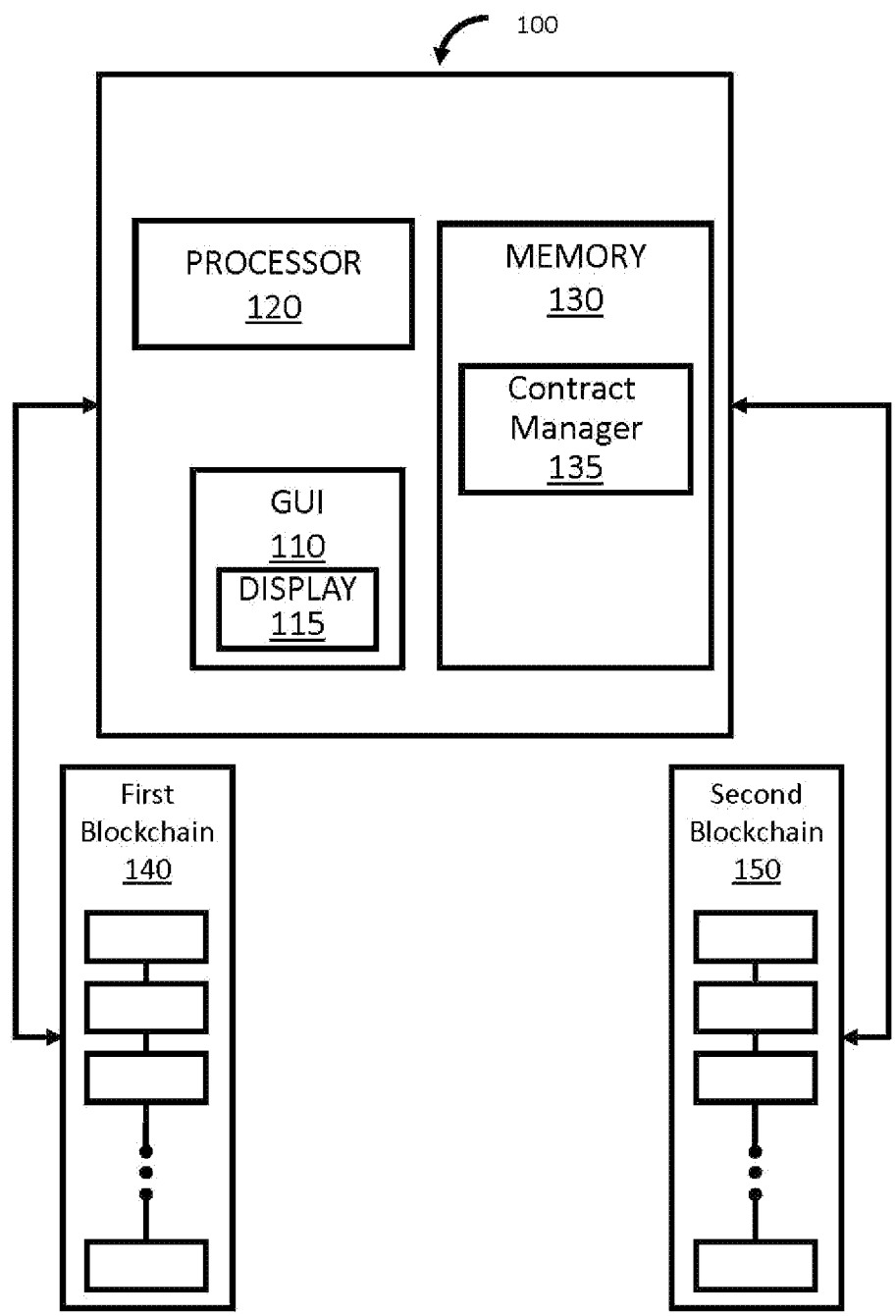
FIG. 11 is a block diagram of a contract manager system according to aspects of the present disclosure.

With reference to FIG. 11, a contract manager system 100 is a system that allows at least two entities to exchange digital currencies of a different type or on different blockchains 140 and 150 (e.g., exchanging XLM digital currency for Stellar Ledger digital currency). The system 100 includes a graphical user interface (GUI) 110 including a display 115, a processor 120, and memory 130. The memory 130 includes instructions stored thereon, which, when executed by the processor 120, cause the system 100 to execute an atomic swap.

An atomic swap is a smart contract technology that enables the exchange of one cryptocurrency related to the first blockchain 140 for another related to the second blockchain 150 without using centralized intermediaries, such as exchanges.

A smart contract is a computer program or a transaction protocol which is intended to automatically execute, control or document legally relevant events and actions according to the terms of a contract or an agreement.

A contract manager 135 is a computer application that is saved in the memory 130 and, when executed, securely manages the execution of an agreement and transfer of payloads between two entities. The responsibilities of the contract manager 135 include managing the payload from the incoming and outgoing oracles, recording the terms of the exchange, confirming transactions and recording the contract details once the atomic swap is complete.

The system 100 is configured to display terms of an agreement to a first entity and a second entity via the GUI 110. The system 100 is further configured to enable the first entity to send to a first smart contract a first transaction payload that includes the terms of the agreement, via the GUI 110.

The system 100 generates a first hash of the first transaction payload. A hash is a value generated by a hash function. A hash function is any function that can be used to map data of arbitrary size to fixed-size values. The values are used to index a fixed-size table called a hash table. Use of a hash function to index a hash table is called hashing or scatter storage addressing.

The system 100 sends the terms of the agreement from the first smart contract to a first outgoing oracle. An oracle is a blockchain middleware that creates a secure connection between smart contracts and various off-chain resources that they need to function. It acts as the middle layer between a blockchain and an Application Programming Interface (API) that translates information for the blockchain to read. An API is a computing interface that defines interactions between multiple software intermediaries.

The system 100 extracts and validates the terms of the agreement from the first smart contract using the outgoing oracle. The system 100 sends the validated terms of the agreement from the first outgoing oracle to a contract manager 135. The system 100 sends the terms of the agreement from the contract manager 135 to a second smart contract via a first incoming oracle. The system 100 enables the second entity to send to the second smart contract a second transaction payload and the first hash via the GUI 110. The system 100 validates that the second transaction is sent to the second smart contract via a second outgoing oracle. The system 100 sends the first transaction payload to the second smart contract and then the second transaction payload to the first smart contract. The system 100 transfers the second transaction payload from the first smart contract to the first entity. The system 100 transfers the first transaction payload from the second smart contract to the second entity and displays to the first entity the receipt of the transfer of the second transaction payload via the GUI 110. The system 100 displays to the second entity the receipt of the transfer of the first transaction payload via the GUI 110.

Each distinct task of relaying messages or transaction payloads to the contract manager 135 is performed by a separate oracle. Generally, there is one oracle for each distinct task. For example, one oracle could be responsible for supplying the contract lifetime. An oracle may only be responsible for the dedicated task and there will only be one oracle at a time supplying the contract lifetime.

By this definition, validating the second transaction is different from validating the first transaction so it will be performed by the second outgoing oracle.

The terms of the agreement include an exchange rate between a first digital currency and a second digital currency, a lifetime of the terms of the agreement, a public blockchain key of the second blockchain 150 (i.e., related to the second digital currency) of the first entity, and a public blockchain key of the first blockchain 140 (i.e., related to the first digital currency) of the second entity. A public key is a cryptographic key that can be obtained and used by anyone to encrypt messages intended for a particular recipient, such that the encrypted messages can be deciphered only by using a second key that is known only to the recipient. Applied to cryptocurrency wallets, the public blockchain key is a wallet address.

The first transaction payload may further include the lifetime of the terms of the agreement, a first amount of the first digital currency, an expected amount of the second digital currency, the public blockchain key of the second digital currency of the first entity, a public blockchain key of the second digital currency of the second entity. The second transaction payload may further include: a second amount of the second digital currency approximately equal to the expected amount of the second digital currency, the first hash; and the public blockchain key of the first digital currency of the second entity.

The instructions, when executed by the processor 120, may further cause the system 100 to generate a first hash of the first transaction payload when the terms of the agreement from the first outgoing oracle to the contract manager 135 are sent.

The instructions, when executed by the processor 120, may further cause the system 100 to: send the first hash to the first outgoing oracle with the terms of agreement, send the first hash from the first outgoing oracle to the contract manager 135 with the validated terms of agreement, send the first hash from the contract manager 135 to the second smart contract via the first incoming oracle and to send, and display via the GUI 110 receipt of, the first hash to the second entity.

The second entity receives the first hash via the following path: Smart Contract A→Outgoing Oracle→Contract Manager→Incoming Oracle→Smart Contract B.

The instructions, when executed by the processor 120, may further cause the system 100 to: set a status of the first smart contract to incomplete after the first smart contract receives the first transaction payload from the first entity, set the status of the second smart contract to incomplete after the second contract receives the second transaction payload to the second entity, set the status of the first smart contract and second smart contract to in progress if the system 100 validates the second transaction payload was sent to the second smart contract, and set the status of the first smart contract and second smart contract to complete after the transfer of the second transaction payload from the first smart contract to the first entity and the transfer of the first transaction payload from the second smart contract to the second entity.

In aspects, the contract manager system 100 is used for exchanging different digital currencies on different blockchains, wherein the system 100 returns the first transaction payload to the first entity, the second transaction payload to the second entity, or both, if, after expiration of a lifetime of the first smart contract or second smart contract, the status of the first contract or second contract is incomplete.

The first smart contract may hold the first amount of the first digital currency in escrow and the second smart contract holds the second amount of the second digital currency. In escrow is a type of legal holding account for items, which can't be released until predetermined conditions are satisfied.

After validating the second transaction payload was sent to the second smart contract, the system 100 may: send the first transaction payload and the second transaction payload to the first outgoing oracle and the second outgoing oracle respectively, send the first transaction payload and second transaction payload from the first outgoing oracle and second outgoing oracle, respectively, to the contract manager 135, then send the first transaction payload from the contract manager 135 to the second smart contract via the first incoming oracle; and finally send the second transaction payload from the contract manager 135 to the first smart contract via a second incoming oracle.

Figure 12A:
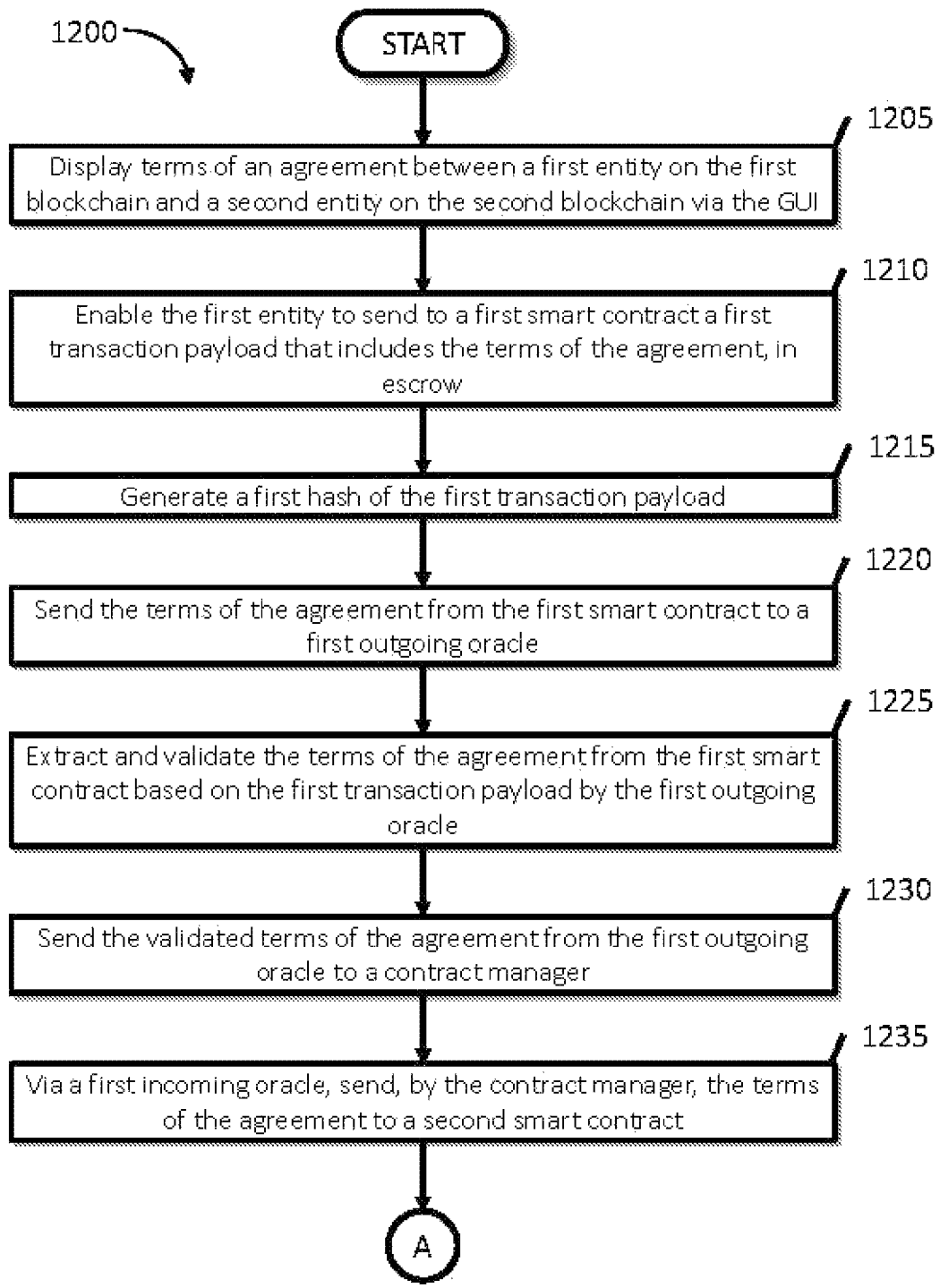
FIGS. 12A and 12B are a flowchart illustrating a method for exchanging different digital currencies on different blockchains according to aspect of the present disclosure.
Figure 12B:
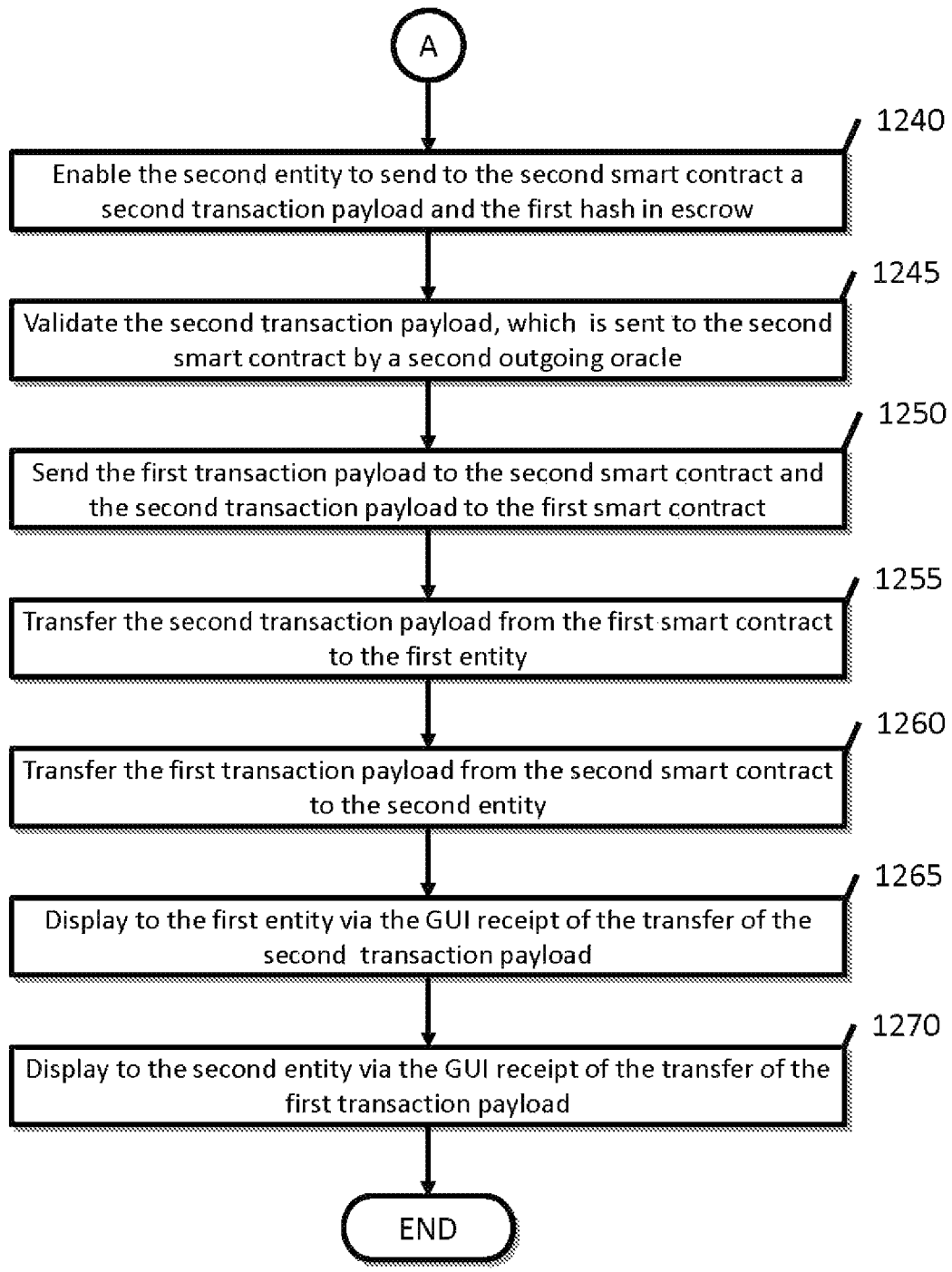

With reference to FIGS. 12A and 12B, a computer-implemented method 1200 is for exchanging different digital currencies on different blockchains via the contract manager system of this disclosure. The method 1200 includes displaying terms of an agreement to a first entity and a second entity via a graphical user interface (GUI) in step 1205, enabling the first entity to send to a first smart contract a first transaction payload that includes the terms of the agreement, in escrow in step 1210, generating a first hash of the first transaction payload in step 1215, sending the terms of the agreement from the first smart contract to a first outgoing oracle in step 1220, extracting and validating the terms of the agreement from the first smart contract using the first outgoing oracle in step 1225, sending the validated terms of the agreement from the first outgoing oracle to a contract manager in step 1230, sending the terms of the agreement from the contract manager to a second smart contract via a first incoming oracle in step 1235, enabling the second entity to send to the second smart contract a second transaction payload and the first hash via the GUI in step 1240, validating that the second transaction payload is sent to the second smart contract in step 1245, sending the first transaction payload to the second smart contract and the second transaction payload to the first smart contract in step 1250, transferring the second transaction payload from the first smart contract to the first entity in step 1255, transferring the first transaction payload from the second smart contract to the second entity in step 1260, displaying to the first entity via the GUI, a receipt of the transfer of the second transaction payload in step 1265, and displaying to the second entity via the GUI receipt of the transfer of the first transaction payload in step 1270.

The terms of the agreement may include an exchange rate between a first digital currency and a second digital currency, a lifetime of the terms of the agreement, a public blockchain key of the second digital currency of the first entity, and a public blockchain key of the first digital currency of the second entity.

The first transaction payload may further include the lifetime of the terms of the agreement, a first amount of the first digital currency, an expected amount of the second digital currency, and the public blockchain key of the second digital currency of the first entity, and a public blockchain key of the second digital currency of the second entity. The second transaction payload includes a second amount of the second digital currency approximately equal to the expected amount of the second digital currency, the first hash, and the public blockchain key of the first digital currency of the second entity.

The first hash of the first transaction payload may be generated when the terms of the agreement from the first outgoing oracle to the contract manager are sent. The method includes sending the first hash to the first outgoing oracle with the terms of agreement, sending the first hash from the first outgoing oracle to the contract manager with the validated terms of agreement, sending the first hash from the contract manager to the second smart contract via the first incoming oracle, and sending the first hash to the second entity, and displaying via the GUI receipt of the first hash.

Other steps of the method include setting a status of the first smart contract to incomplete after the first smart contract receives the first transaction payload from the first entity, setting the status of the second smart contract to incomplete after the second contract receives the second transaction payload to the second entity, setting the status of the first smart contract and second smart contract to in progress if the system validates the second transaction payload was sent to the second smart contract, and setting the status of the first smart contract and second smart contract to complete after the transfer of the second transaction payload from the first smart contract to the first entity and the transfer of the first transaction payload from the second smart contract to the second entity.

At another step, the method includes returning the first transaction payload to the first entity, the second transaction payload to the second entity, or both, if, after expiration of a lifetime of the first smart contract or second smart contract, the status of the first contract or second contract is incomplete.

The first smart contract holds the first amount of the first digital currency in escrow and the second smart contract holds the second amount of the second digital currency.

After validating the second transaction payload has been sent to the second smart contract, the method may include the steps of: sending the first transaction payload and the second transaction payload to the first outgoing oracle and the second outgoing oracle respectively, sending the first transaction payload and second transaction payload from the first outgoing oracle and second outgoing oracle, respectively, to the contract manager 135. Sending the first transaction payload from the contract manager to the second smart contract via the first incoming oracle, and finally sending the second transaction payload from the contract manager to the first smart contract via a second incoming oracle.

Another contract manager system of this disclosure is used for exchanging different digital currencies on different blockchains. The contract manager system may include a graphical user interface (GUI) including a display, a processor, and memory. The memory includes instructions stored thereon, which, when executed by the processor, cause the system to enable a first entity and a second entity to exchange the different digital currencies on different blockchains. The system displays terms of an agreement to a first entity and a second entity via the GUI. The system enables the first entity and second entity to send to a first smart contract and a second smart contract, respectively, a first transaction payload that includes the terms of the agreement and a second transaction payload, respectively, via the GUI. The system sends the terms of agreement to a contract manager and from the contract manager to the second smart contract, The system validates that the second transaction payload is sent to the second smart contract, sends the first transaction payload to the second smart contract and the second transaction payload to the first smart contract, transfers the second transaction payload from the first smart contract to the first entity, and transfers the first transaction payload from the second smart contract to the second entity. the system displays to the first and second entities, via the GUI, receipt of the transfer of the second and first transaction payloads, respectively.

The system generates a first hash of the first transaction payload, sends the terms of the agreement from the first smart contract to a first outgoing oracle, extracts and validates the terms of the agreement from the first smart contract using the first outgoing oracle, sends the validated terms of the agreement from the first outgoing oracle to a contract manager, sends the terms of the agreement from the contract manager to a second smart contract via a first incoming oracle, and enables the second entity to send to the second smart contract the first hash in addition to the second transaction payload via the GUI.

Figure 13:
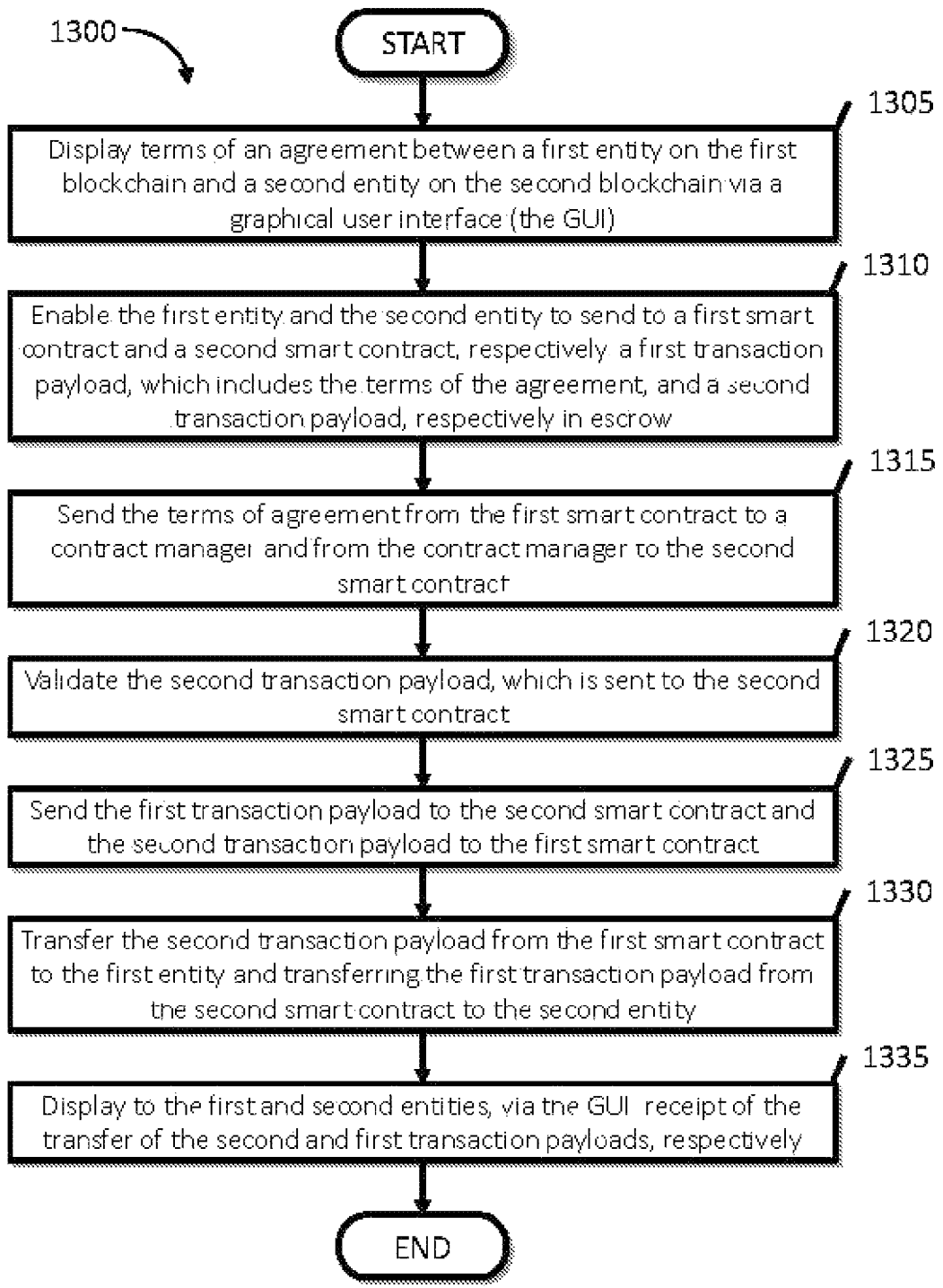
FIG. 13 is a flowchart illustrating a method for exchanging a first digital currency on a first blockchain with a second digital currency on a second blockchain according to aspects of the present disclosure.

With reference to FIG. 13, a computer implemented method 1300 is for exchanging different digital currencies on different blockchains. The method 1300 includes displaying terms of an agreement between a first entity and a second entity via the GUI in step 1305, enabling the first entity and second entity to send to a first smart contract and a second smart contract, respectively, a first transaction payload that includes the terms of the agreement and a second transaction payload, respectively, in escrow in step 1310, sending the terms of agreement to a contract manager and from the contract manager to the second smart contract in step 1315, validating that the second transaction payload is sent to the second smart contract in step 1320, sending the first transaction payload to the second smart contract and the second transaction payload to the first smart contract in step 1325, transferring the second transaction payload from the first smart contract to the first entity and transferring the first transaction payload from the second smart contract to the second entity in step 1330, and finally displaying to the first and second entities, via the GUI, receipt of the transfer of the second and first transaction payloads, respectively, in step 1335. The method 1300 may further include generating a first hash of the first transaction payload, sending the terms of the agreement from the first smart contract to a first outgoing oracle, extracting and validating the terms of the agreement from the first smart contract using the first outgoing oracle, sending the validated terms of the agreement from the first outgoing oracle to a contract manager, sending the terms of the agreement from the contract manager to a second smart contract via a first incoming oracle, and enabling the second entity to send to the second smart contract the first hash in addition to the second transaction payload via the GUI.

With reference to FIGS. 1-10, an exemplary exchange of different digital currencies (e.g., ETH and XLM) on different blockchains between a first entity and a second entity via the contract manager system and methods thereof are illustrated.

Figure 1:
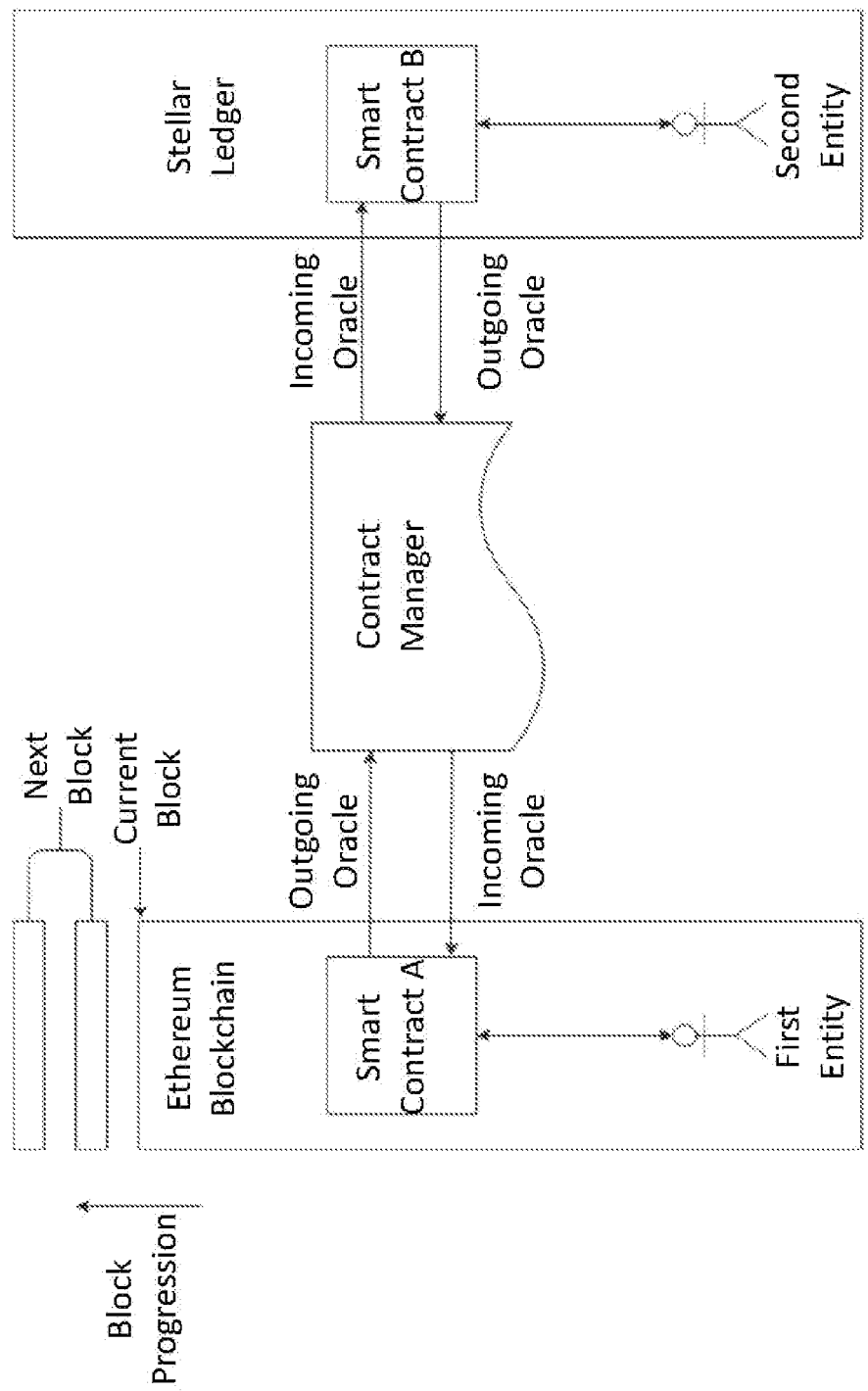
FIG. 1 is a flow diagram of a contract manager system for exchanging digital currencies on different blockchains via an atomic swap transaction according to aspects of the present disclosure.

With reference to FIG. 1, the first entity would like to exchange ETH for XLM. In a case when the second entity tries to exchange XLM for ETH, this exchange can be achieved P2P without a middle man using atomic swaps across the Ethereum blockchain and the Stellar ledger via the contract manager system of this disclosure.

Figure 2:
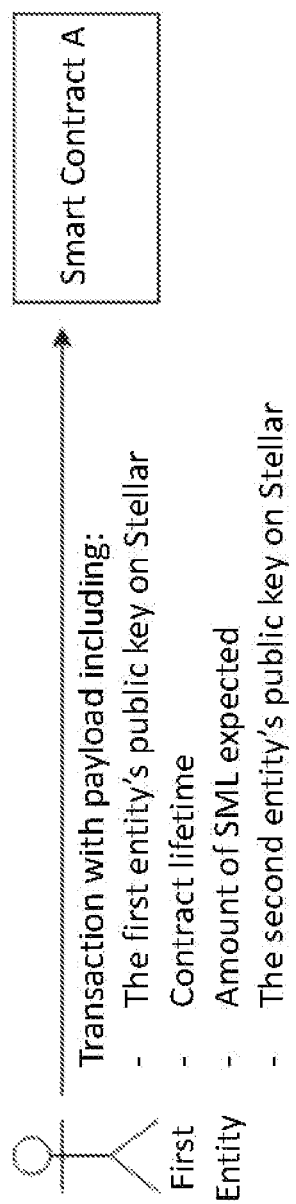
FIG. 2 is a flow diagram of a first entity providing a payload to a first smart contract according to aspects of the present disclosure.

With reference to FIG. 2, the first entity and the second entity agree on the terms of the exchange including: the exchange rate between ETH and XLM, the contract lifetime, measured in blocks on Ethereum and supplied by an incoming oracle on the Stellar ledger, the first entity's public key on Stellar, and the second entity's public key on Ethereum.

The first entity initiates the atomic swap by sending the terms agreed upon ETH to a smart contract on the Ethereum blockchain. The second entity can also initiate the swap.

Figure 3:
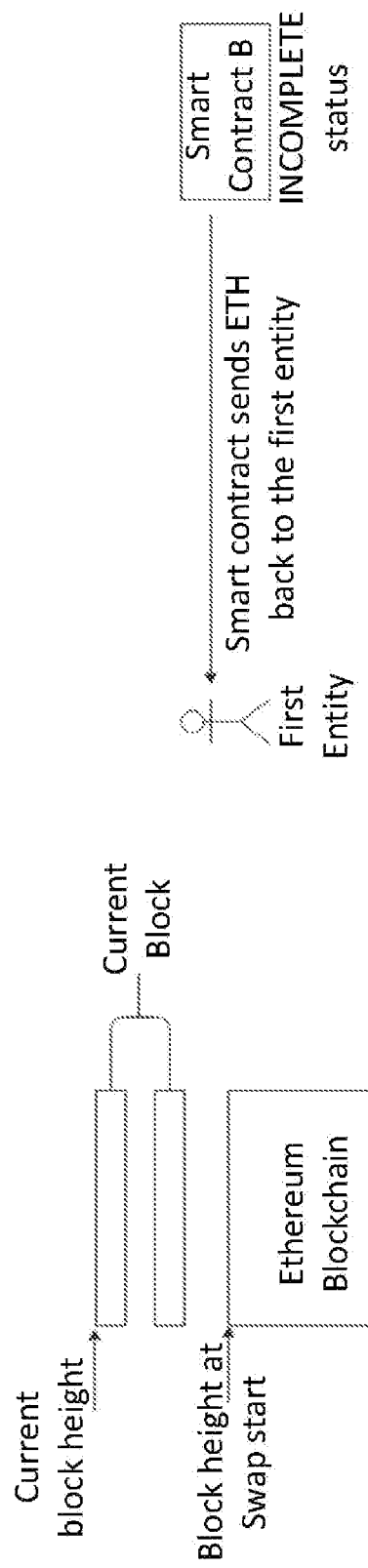
FIG. 3 is a flow diagram illustrating a time-limit and status of an atomic swap transaction according to aspects of the present disclosure.

With reference to FIG. 3, the smart contract holds the ETH in escrow under the condition that if the smart contract lifetime expires while the status of the contract is INCOMPLETE, the smart contract will revert the transaction and send the funds back to the first entity.

Figure 4:
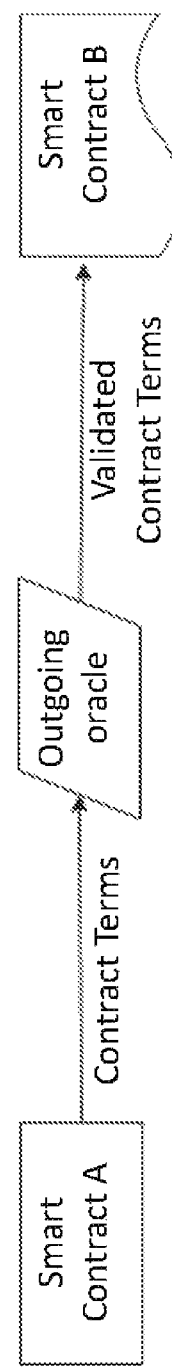
FIG. 4 is a flow diagram of a payload transfer between a first contract and a contract manager via an oracle according to aspects of the present disclosure.

With reference to FIG. 4, the Contract Manager is responsible for receiving the payload from the outgoing oracles and arming the incoming oracles with their payload.

The outgoing oracle from the Ethereum blockchain extracts the contract terms from the Ethereum smart contract.

Figure 5:
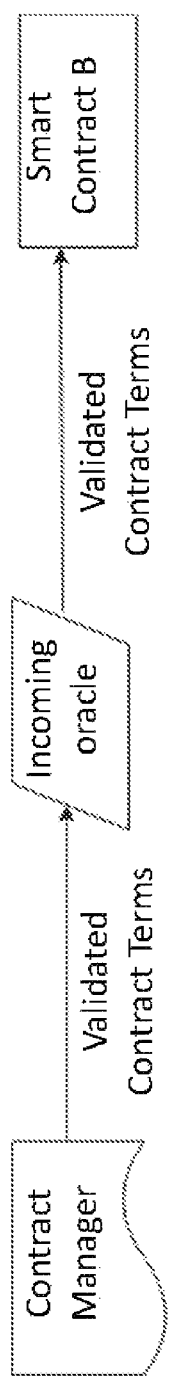
FIG. 5 is a flow diagram of a part of a transaction payload transfer between the contract manager and a second contract via another oracle according to aspects of the present disclosure.

With reference to FIG. 5, the incoming oracle from the Stellar smart contract writes the validated contract terms to the Stellar smart contract.

With reference to FIG. 5, the contract terms as proposed by the first entity are now in the Stellar smart contract. The contract lifetime is calculated using the average block time, represented in seconds.

Figure 6:
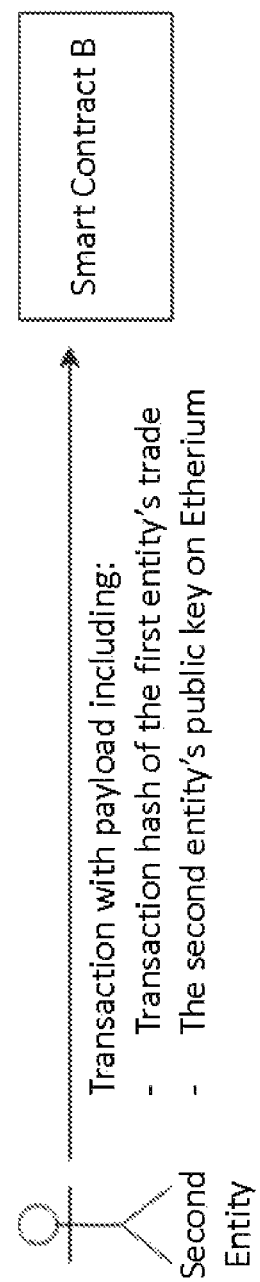
FIG. 6 is a flow diagram of a second transaction payload transferred by a second entity to a second smart contract according to aspects of the present disclosure.

With reference to FIG. 6, the second entity is aware of the impending trade and has been waiting for it. The second entity sends the expected XLM to the Stellar smart contract.

Figure 7:
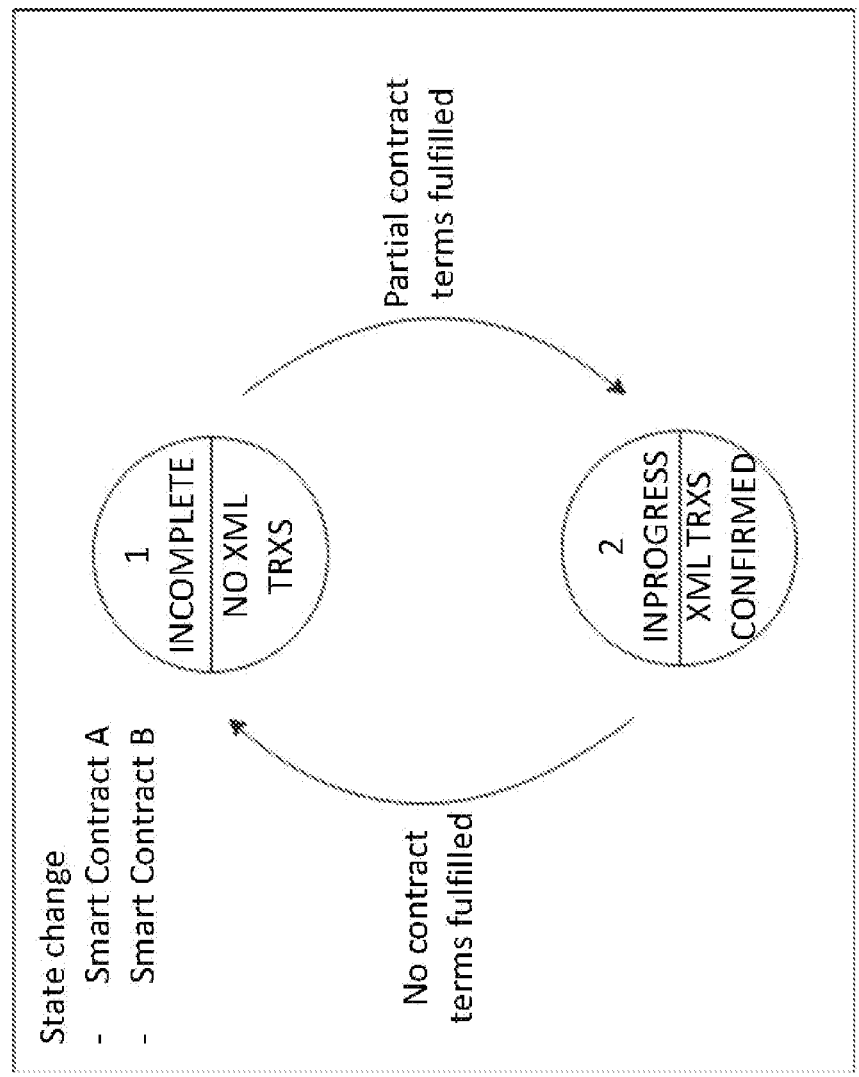
FIG. 7 is a state diagram of a status change related to the atomic swap transaction according to aspects of the present disclosure.

With reference to FIG. 7, the Stellar smart contract holds the second entity's funds in escrow under a similar condition as the Ethereum smart contract. If the smart contract lifetime expires while the status of the contract is INCOMPLETE, the smart contract will revert the transaction and send the funds back to the second entity.

After the confirmation of The second entity's transfer on the Stellar ledger, simultaneous incoming oracles alter the status of the Stellar smart contract and the Ethereum smart contract to INPROGRESS.

Figure 8:
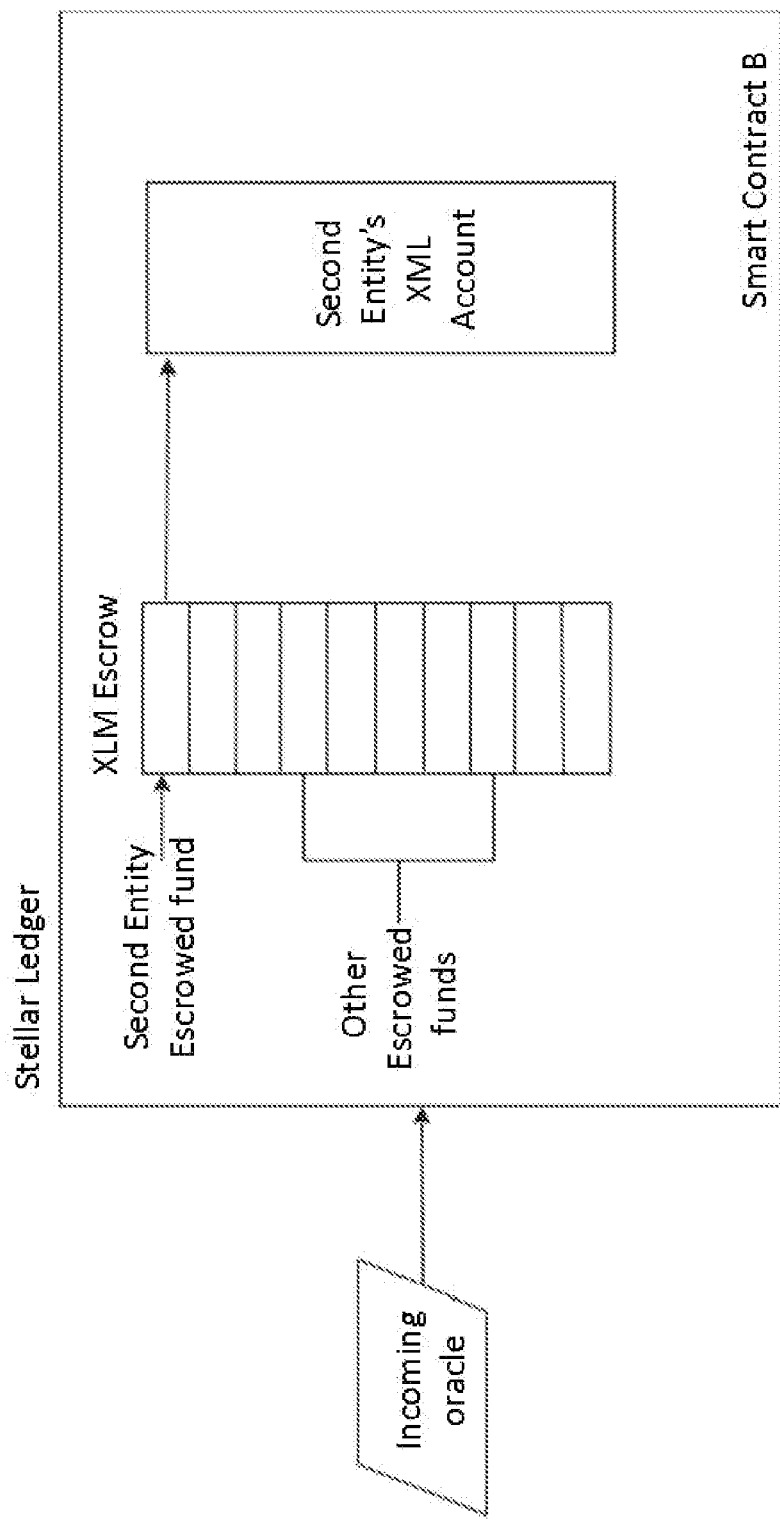
FIG. 8 is a block diagram illustrating transfer of the first transaction payload to the second entity according to aspects of the present disclosure.

With reference to FIG. 8, the Contract Manager now has the details of the first entity's trade, The second entity's trade and the contract terms. This is a stable state not limited by time because the status of both the smart contracts is INPROGRESS.

The Contract Manager arms the Stellar incoming oracle with payload to deliver the XLM held in escrow by the Stellar smart contract to the first entity's Stellar public key.

Figure 9:
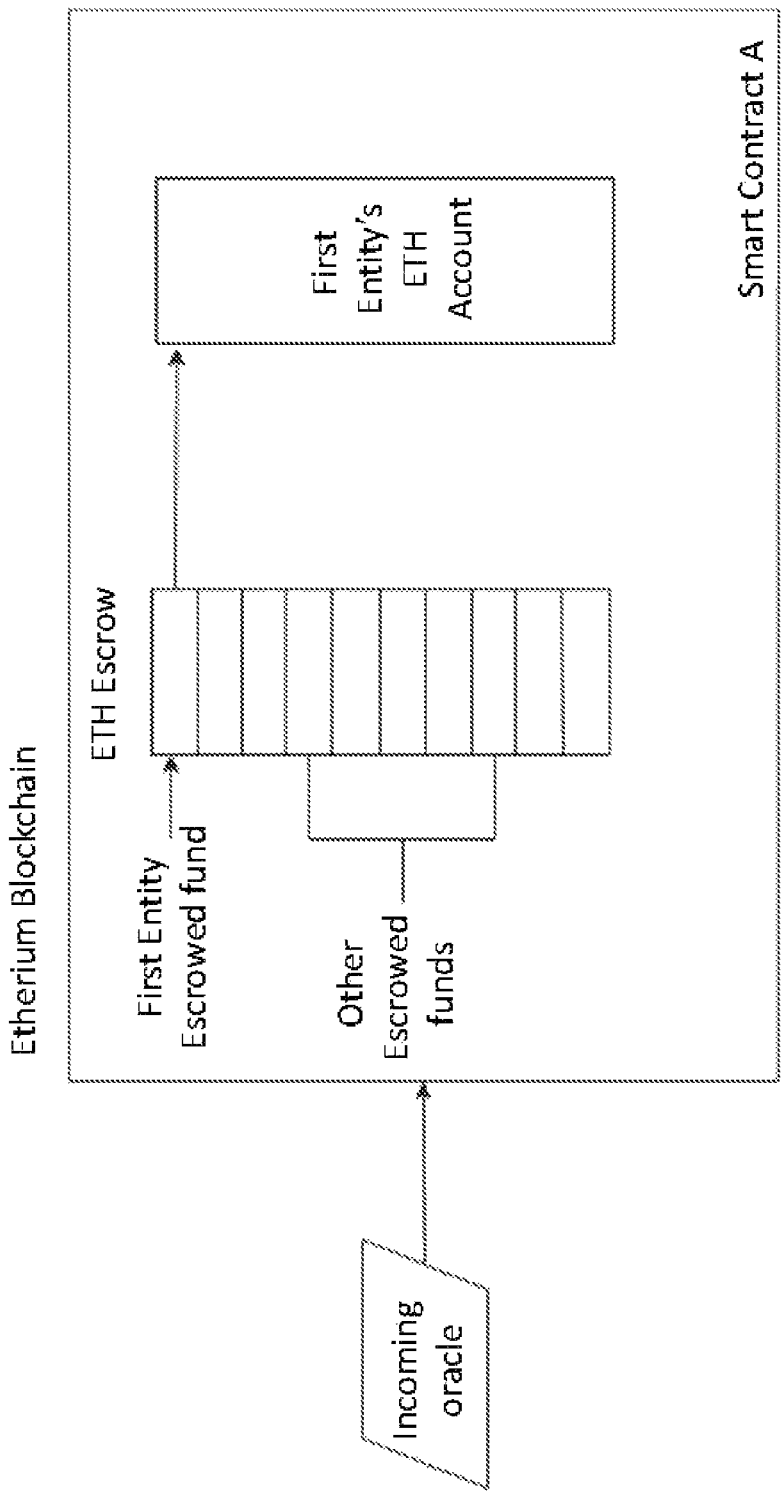
FIG. 9 is a bloc diagram illustrating transfer of the second transaction payload to the first entity according to aspects of the present disclosure.

With reference to FIG. 9, the Contract Manager arms the Ethereum incoming oracle with payload to deliver the ETH held in escrow by the Ethereum smart contract to the second entity's Ethereum public key.

Figure 10:
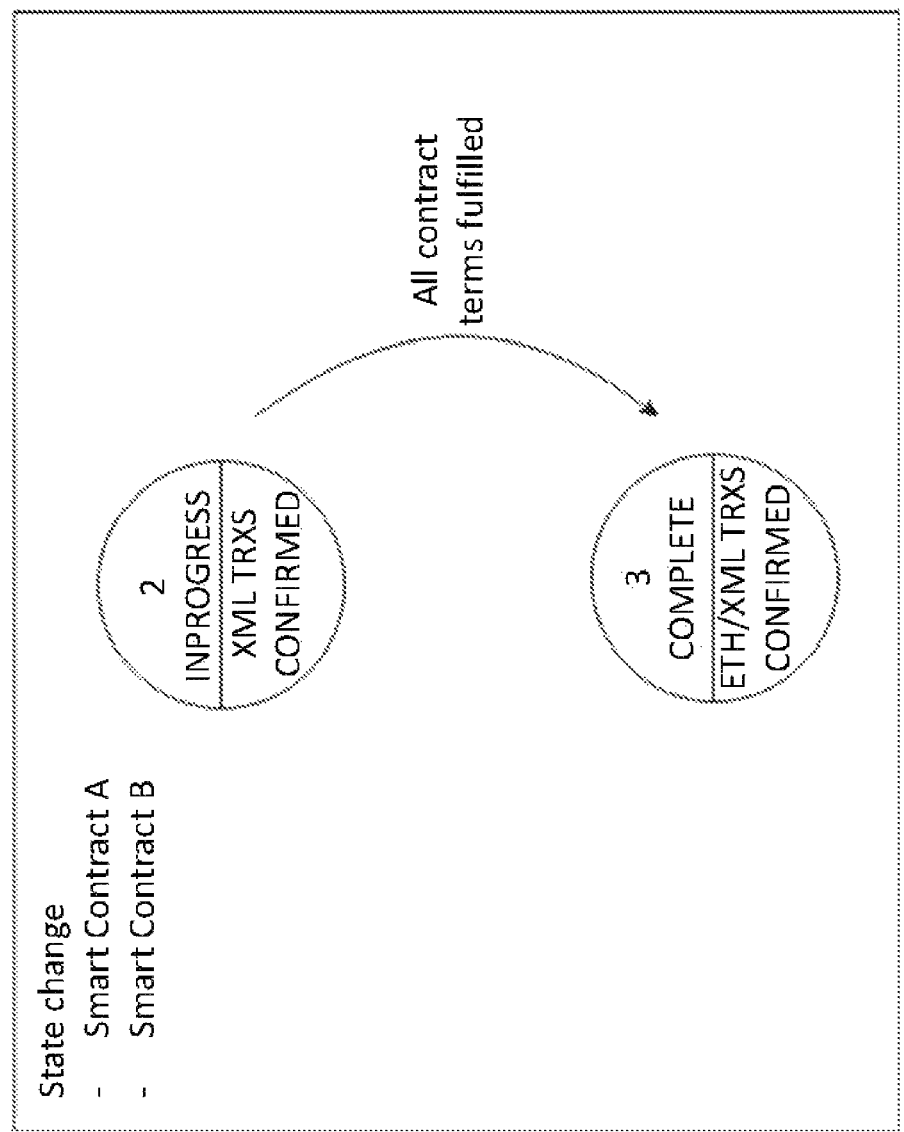
FIG. 10 is a state diagram of a status change related to the atomic swap transaction according to aspects of the present disclosure.

With reference to FIG. 10, the Contract Manager confirms both transactions then simultaneously invoking the Ethereum incoming oracle and the Stellar incoming oracle to alter the status of both smart contracts from INPROGRESS to COMPLETE.

The swap is complete at this point. The Contract Manager writes the contract details to a blockchain decentralized web for immutability and packages the information in the SWIFT GPI (Society for Worldwide Interbank Financial Telecommunication Global Payments Innovation)/ISO (International Organization for Standardization) 20022 format for consumption by third parties.

What is claimed is:

1. A contract manager system for exchanging a first digital currency on a first blockchain with a second digital currency on a second blockchain, comprising:
   a graphical user interface (GUI) including a display;
   a processor; and
   a memory, including instructions stored thereon that, when executed by the processor, cause the processor to:
      display terms of an agreement between a first entity on the first blockchain and a second entity on the second blockchain via the GUI;
      on behalf of the first entity and to a first smart contract, a first transaction payload that includes the terms of the agreement, in escrow;
      generate a first hash of the first transaction payload;
      send the terms of the agreement from the first smart contract to a first outgoing oracle;
      extract and validate the terms of the agreement from the first smart contract based on the first transaction payload using the first outgoing oracle;
      send the validated terms of the agreement from the first outgoing oracle to a contract manager;
      send, from the contract manager, the terms of the agreement to a second smart contract via a first incoming oracle;
      send, on behalf of the second entity and to the second smart contract, a second transaction payload and the first hash in escrow;
      validate the second transaction payload, which is sent to the second smart contract via a second outgoing oracle;
      send the first transaction payload to the second smart contract and the second transaction payload to the first smart contract;
      transfer the second transaction payload from the first smart contract to the first entity;
      transfer the first transaction payload from the second smart contract to the second entity;
      display to the first entity via the GUI receipt of the transfer of the second transaction payload; and
      display to the second entity via the GUI receipt of the transfer of the first transaction payload.

2. The contract manager system of claim 1, wherein the terms of the agreement include an exchange rate between the first digital currency and the second digital currency, a lifetime of the terms of the agreement, a public blockchain key of the second blockchain of the first entity (PBK2A), and a public blockchain key of the first blockchain of the second entity (PBK1B).

3. The contract manager system of claim 2, wherein the first transaction payload further includes:
   the lifetime of the terms of the agreement;
   a first amount of the first digital currency;
   an expected amount of the second digital currency;
   the public blockchain key of the second blockchain of the first entity (PBK2A); and
   a public blockchain key of the second blockchain of the second entity (PBK2B), and
   wherein the second transaction payload includes:
   a second amount of the second digital currency equal to the expected amount of the first digital currency;
   the first hash; and
   the public blockchain key of the first blockchain of the second entity (PBK1B).

4. The contract manager system of claim 3, wherein the first smart contract holds the first amount of the first digital currency in escrow and the second smart contract holds the second amount of the second digital currency in escrow.

5. The contract manager system of claim 4, wherein the memory stores the instructions, when executed by the processor, after validating the terms of the agreement based on the second transaction payload, further cause the processor to:
   send the first transaction payload and the second transaction payload to the first outgoing oracle and the second outgoing oracle, respectively;
   send the first transaction payload and the second transaction payload from the first outgoing oracle and the second outgoing oracle, respectively, to the contract manager;
   send the first transaction payload from the contract manager to the second smart contract via the first incoming oracle; and
   send the second transaction payload from the contract manager to the first smart contract via a second incoming oracle.

6. The contract manager system of claim 1, wherein the first hash of the first transaction payload is generated when the terms of the agreement from the first outgoing oracle to the contract manager are sent.

7. The contract manager system of claim 6, wherein the memory stores the instructions, when executed by the processor, further cause the processor to:
   send the first hash to the first outgoing oracle with the terms of the agreement;
   send the first hash from the first outgoing oracle to the contract manager with the validated terms of the agreement;
   send the first hash from the contract manager to the second smart contract via the first incoming oracle; and
   send and display via the GUI receipt of the first hash to the second entity.

8. The contract manager system of claim 1, wherein the memory stores the instructions, when executed by the processor, further cause the processor to:
   set a status of the first smart contract to incomplete after the first smart contract receives the first transaction payload from the first entity;
   set the status of the second smart contract to incomplete after the second contract receives the second transaction payload to the second entity;
   set the status of the first smart contract and the second smart contract to in progress when the processor validates the second transaction payload, which was sent to the second smart contract; and
   set the status of the first smart contract and the second smart contract to complete after the transfer of the second transaction payload from the first smart contract to the first entity and the transfer of the first transaction payload from the second smart contract to the second entity.

9. The contract manager system of claim 8, wherein the memory stores the instructions that, when executed by the processor, further cause the processor to return the first transaction payload to the first entity, the second transaction payload to the second entity, or both, when, after expiration of a lifetime of the first smart contract or the second smart contract, the status of the first smart contract or the second smart contract remains as incomplete.

10. A method for exchanging a first digital currency on a first blockchain with a second digital currency on a second blockchain, comprising:
    displaying, a processor of a contract manager system, terms of an agreement between a first entity on the first blockchain and a second entity on the second blockchain via a graphical user interface (GUI);
    sending, by the processor, on behalf of the first entity and to a first smart contract, a first transaction payload according to the terms of the agreement, in escrow;
    generating, by the processor, a first hash of the first transaction payload;
    sending, by the processor, the terms of the agreement from the first smart contract to a first outgoing oracle;
    extracting and validating, by the processor, the terms of the agreement from the first smart contract based on the first transaction payload using the first outgoing oracle;
    sending, by the processor, the validated terms of the agreement from the first outgoing oracle to a contract manager;
    sending, by the processor, the terms of the agreement from the contract manager to a second smart contract via a first incoming oracle;
    sending, by the processor, on behalf of the second entity and to the second smart contract, a second transaction payload and the first hash in escrow;
    validating, by the processor, the second transaction payload, which is sent to the second smart contract via a second outgoing oracle;
    sending, by the processor, the first transaction payload to the second smart contract and the second transaction payload to the first smart contract;
    transferring, by the processor, the second transaction payload from the first smart contract to the first entity;
    transferring, by the processor, the first transaction payload from the second smart contract to the second entity;
    displaying, by the processor, to the first entity via the GUI receipt of the transfer of the second transaction payload; and
    displaying, by the processor, to the second entity via the GUI receipt of the transfer of the first transaction payload.

11. The method of claim 10, wherein the terms of the agreement include an exchange rate between the first digital currency and the second digital currency, a lifetime of the terms of the agreement, a public blockchain key of the second blockchain of the first entity (PBK2A), and a public blockchain key of the first blockchain of the second entity (PBK1B).

12. The method of claim 11, wherein the first transaction payload further includes:
the lifetime of the terms of the agreement;
a first amount of the first digital currency;
an expected amount of the second digital currency;
the public blockchain key of the second blockchain of the first entity (PBK2A); and
a public blockchain key of the second blockchain of the second entity (PBK2B), and
wherein the second transaction payload includes:
a second amount of the second digital currency equal to the expected amount of the second digital currency;
the first hash; and
the public blockchain key of the first blockchain of the second entity (PBK1B).

13. The method of claim 12, wherein the first smart contract holds the first amount of the first digital currency in escrow and the second smart contract holds the second amount of the second digital currency in escrow.

14. The method of claim 13, further comprising,
after validating the terms of the agreement based on the second transaction payload:
sending, by the processor, the first transaction payload and the second transaction payload to the first outgoing oracle and the second outgoing oracle, respectively;
sending, by the processor, the first transaction payload and the second transaction payload from the first outgoing oracle and the second outgoing oracle, respectively, to the contract manager;
sending, by the processor, the first transaction payload from the contract manager to the second smart contract via the first incoming oracle; and
sending, by the processor, the second transaction payload from the contract manager to the first smart contract via a second incoming oracle.

15. The method of claim 10, wherein the first hash of the first transaction payload is generated when the terms of the agreement from the first outgoing oracle to the contract manager are sent.

16. The method of claim 15, further comprising:
sending, by the processor, the first hash to the first outgoing oracle with the terms of the agreement;
sending, by the processor, the first hash from the first outgoing oracle to the contract manager with the validated terms of the agreement;
sending, by the processor, the first hash from the contract manager to the second smart contract via the first incoming oracle; and
sending and displaying, by the processor, via the GUI, receipt of the first hash to the second entity.

17. The method of claim 10, further comprising:
setting, by the processor, a status of the first smart contract to incomplete after the first smart contract receives the first transaction payload from the first entity;
setting, by the processor, the status of the second smart contract to incomplete after the second contract receives the second transaction payload to the second entity;
setting, by the processor, the status of the first smart contract and the second smart contract to in progress when the second transaction payload, which was sent to the second smart contract, is validated; and
setting, by the processor, the status of the first smart contract and the second smart contract to complete after the transfer of the second transaction payload from the first smart contract to the first entity and the transfer of the first transaction payload from the second smart contract to the second entity.

18. The method of claim 17, further comprising returning, by the processor, the first transaction payload to the first entity, the second transaction payload to the second entity, or both, when, after expiration of a lifetime of the first smart contract or the second smart contract, the status of the first smart contract or the second smart contract remains as incomplete.

19. A contract manager system for exchanging a first digital currency on a first blockchain with a second digital currency on a second blockchain, comprising:
a graphical user interface (GUI) including a display;
a processor; and
a memory, including instructions stored thereon, when executed by the processor, cause the processor to:
display terms of an agreement between a first entity in the first blockchain and a second entity in the second blockchain via the GUI;
send, on behalf of the first entity and second entity, to a first smart contract and a second smart contract, respectively, a first transaction payload, which includes the terms of the agreement, and a second transaction payload, respectively in escrow;
send the terms of agreement from the first smart contract to a contract manager and from the contract manager to the second smart contract;
validate the second transaction payload, which is sent to the second smart contract;
send the first transaction payload to the second smart contract and the second transaction payload to the first smart contract;
transfer the second transaction payload from the first smart contract to the first entity and transfer the first transaction payload from the second smart contract to the second entity; and
display to the first and second entities, via the GUI, receipt of the transfer of the second and first transaction payloads, respectively.

20. The contract manager system of claim 19, wherein the memory stores the instructions, when executed by the processor, further cause the processor to:
generate a first hash of the first transaction payload;
send the terms of the agreement from the first smart contract to a first outgoing oracle;
validate, by the first outgoing oracle, the terms of the agreement from the first smart contract;
send, by the first outgoing oracle, the validated terms of the agreement to a contract manager;
send, from the contract manager, the terms of the agreement to the second smart contract via a first incoming oracle; and
send, on behalf of the second entity and to the second smart contract, the first hash in addition to the second transaction payload.

21. A method for exchanging a first digital currency on a first blockchain with a second digital currency on a second blockchain, comprising:
displaying, by the processor, terms of an agreement between a first entity on the first blockchain and a second entity on the second blockchain via a graphical user interface (GUI);
sending, by the processor, on behalf of the first entity and the second entity and to a first smart contract and a second smart contract, respectively, a first transaction payload, which includes the terms of the agreement, and a second transaction payload, respectively in escrow;

sending, by the processor, the terms of agreement from the first smart contract to a contract manager and from the contract manager to the second smart contract;

validating, by the processor, the second transaction payload, which is sent to the second smart contract;

sending, by the processor, the first transaction payload to the second smart contract and the second transaction payload to the first smart contract;

transferring, by the processor, the second transaction payload from the first smart contract to the first entity and transferring the first transaction payload from the second smart contract to the second entity; and displaying, by the processor, to the first and second entities, via the GUI, receipt of the transfer of the second and first transaction payloads, respectively.

22. The method of claim 21, further comprising:

generating, by the processor, a first hash of the first transaction payload;

sending, by the processor, the terms of the agreement from the first smart contract to a first outgoing oracle;

validating, by the processor, on behalf of the first outgoing oracle, the terms of the agreement from the first smart contract;

sending, by the processor, on behalf of the first outgoing oracle, the validated terms of the agreement to the contract manager;

sending, by the processor, from the contract manager, the terms of the agreement from to the second smart contract via a first incoming oracle; and sending, by the processor, on behalf of the second entity and to the second smart contract, the first hash in addition to the second transaction payload.

\* \* \* \* \*